3,102,817
BEVERAGE FLAVORS AND PROCESS FOR
THEIR PRODUCTION
Julius Green, New City, N.Y., assignor to General Foods Corporation, White Plains, N.Y., a corporation of Delaware
No Drawing. Filed Oct. 16, 1962, Ser. No. 231,012
10 Claims. (Cl. 99—140)

This invention relates to the production of flavors and, more particularly, is concerned with the production of novel flavors which can be employed alone or in combination with other flavor and aroma constituents for use in beverages and other food products where it is desired to have flavors and aromas resembling chocolate, coffee, tea and the like.

Heretofore, many attempts have been made to produce such a flavor by subjecting materials such as cereal grains, proteins, sugars, legumes, malt, and other raw materials to elevated temperatures and whereby a flavor product is obtained which is generally brown in color and extractable by hot aqueous materials. However, the conditions of reaction were such that the product of this process was not acceptable to the consumer in that the flavor and aroma of the product did not closely resemble that of the natural beverage.

It has now been discovered that a superior food flavor can be produced by reacting a hydrous mixture of a proteinaceous substance containing a sulfur-bearing amino acid with a saccharide in a vessel by rapidly heating said mixture to a temperature of at least 350° F. and enclosing the gaseous constituents developed in such vessel during a period of time necessary to develop flavor, the gaseous constituents being enclosed in order to maintain a pressure sufficient to maintain a hydrous reaction condition at temperatures above 350° F. Upon development of flavor, the temperature of the reaction liquor is rapidly reduced to a point sufficient to arrest and terminate flavor development, this being achieved by rapidly reducing the temperature of the constituents in the vessel to below 250° F. and most preferably below 212° F.

The reaction conditions required to develop flavor in accordance with the present invention are such that they unexpectedly develop vapor pressures much greater than could be predicted and substantially greater than the normal pressure for saturated steam at the particular temperature of operation. Indeed, this dramatic pressure development forms the basis for deciding at what point the reaction occurs. This pressure rise will vary from 75 to 225 p.s.i.g. over the normal pressure for saturated steam at the reaction temperature. The flavor-producing reaction is obscure, since a number of flavor-producing mechanisms, such as caramelization, pyrolysis, and polymerization reactions, can occur. It has been found that a flavor-producing reaction producing the flavor products of the present invention will not take place when the reactants of the present invention are reacted at temperatures below 350° F., no matter what lengths of time they are heated. Flavor products developed below 350° F. have been observed to interfere with the desired flavor notes. It has also been observed that when the reaction conditions are such that a temperature of at least 350° F. is achieved rapidly, the flavor ordinarily developed by carrying out the reaction at temperatures below 350° F. are not present to the extent that they interfere with the desirable attributes of flavors developed above that temperature. Thus, should a flavor-producing reaction be carried out for a long period of time before a temperature of 350° F. and above is reached, it has been found that the quality of flavor produced is much inferior to that produced by heating the reactants to 350° F. rapidly.

In producing flavor in accordance with the present invention, the reaction liquor is maintained in its hydrous condition for a holding period at or above 350° F. The length of this holding period will be dependent upon a number of factors, most significant of which are the peak reaction temperature to be achieved and the rate at which the reactants are to be heated to this peak reaction temperature, as well as the rate at which cooling is to be carried out upon reaching said peak temperature. The higher the peak reaction temperature achieved, the shorter the required holding period will be. Once a reaction temperature of 350° F. is achieved, the rate at which the flavor process proceeds accelerates greatly. The reaction period above 350° F. should be as short as possible, since it is found that this reduces the opportunity for accompaniment of undesirable interfering flavors, which is borne out by organoleptic findings where an unfavorable preponderance of undesirable flavor notes is observed to interfere with the desired flavor contributions obtained at temperatures of 350° F. and above. Consequently, although the flavor process of the present invention contemplates rapidly achieving the minimum temperature specified above and maintaining such temperature for a relatively long period of time during which improved flavor is obtained, the more preferred flavor products will be derived by further rapid elevation of the temperature of the reaction liquor, thereby occasioning a short holding period.

It is generally required that the reaction liquor be held at a peak reaction temperature of 350° F. for between 20–40 minutes when it took approximately 26 minutes to reach this reaction temperature. At a peak temperature of 380° F., it has been found that the reaction liquor should be held at that temperature for approximately 10 minutes when it took approximately 29 minutes to reach this reaction temperature. On the other hand, when a peak temperature of 405° F. is reached, no further holding is generally required when it took approximately 32 minutes to reach this reaction temperature.

Since it is important in carrying out the present flavor process that the temperature of the reaction be rapidly lowered in order to terminate those flavor-producing reactions producing desired flavor as well as those which may impart flavors detracting from the quality of the final product, the terminal temperature, and hence the holding period, for the reaction must, for practical considerations, be limited by the facility with which the reaction vessel can be cooled. Consequently, although terminal temperatures of the order of 475° F. and above are operative, the ability to thereafter cool the reaction liquor upon flavor development is limited such that it has been generally found preferable to practice terminal temperatures below, say 420° F., and more preferably in the neighborhood of 400°–405° F.

Although improved flavor products are obtained without controlling the pH of the reaction liquor, it has been observed that control of the level of acidity during reaction produces more preferred flavor. Thus, chocolate or coffee type flavors have been obtained without employing any means to control the pH during the reaction with the reaction liquor having a pH in the order of 3.5 after quenching. This is indicative of the fact that the reaction produces acid materials. However, since the presence of some water (at least about 10%) is necessary to maintain the proper development of the flavor normally associated with beverage flavors, where astringency and acidity are desired, and since moisture (although its entire function is not completely understood) operates to increase the acidity of the reaction liquor, buffer salts capable of neutralizing acidity during the flavor process should be utilized. However, buffer salts are not necessary in all instances, since in many cases the materials used will possess as one of their constituents one or more compounds which will react with any acid produced to take the acid out of solution and thus maintain the conditions needed for the reaction to proceed. In addition, it is also possible to neutralize the acid which has been produced during the course of the reaction at the termination of the reaction, provided, of course, that the pH of the reaction media was lower than that necessary for production of the flavor of this invention. The control of pH during the reaction process by use of such buffering agents as calcium carbonate, disodium ortho-phosphate, and other alkali and alkaline earth metal salts of carbonates, phosphates, therefore permits the use of high levels of moisture while offering control of reaction pH, although carbonates are the most preferred. In any event, it is preferred to have a terminal pH in the reaction liquor above 4.0, the most preferred range being between 4.5 and 5.2. Control of pH is important in another respect, since in addition to fostering the production of better flavor, the flavor product will be above that level of acidity at which curdling of milk, cream, or evaporated milk added to the beverage prepared from the flavor product will occur. In this latter connection, it has been found that an effective acidity control requires a terminal pH in the flavor product of approximately 5.2. In general, the upper level for optimal flavor development of many beverage flavors is at a pH below 7.0 during the aforesaid heating and holding period and the lower level is above 4.0.

As indicated herein, the role of moisture in fostering quality flavor development is at least in part one of offering acidity to the flavor of the reaction liquor. In specifying a hydrous reaction mixture, a moisture content during the holding period of at least 10% is to be understood, but in order to operate this reaction under normal operating conditions, it is practical to have a sufficient amount of water to render the batch being treated fluid. For example, the ratio of two parts water to one part solids has been found generally satisfactory. In addition to the other function mentioned above, water serves to promote effective heat transfer and much of the water which is produced in the course of the reaction will participate in fulfilling this need. However, in this connection, other non-aqueous materials may be employed as heat transfer mediums, to wit, mineral oil and glycerine.

The reaction vessel which is employed should be one which is capable of maintaining a hydrous reaction mixture throughout the flavor-producing process at the temperatures practiced therefor. In general, the system which is used should be one which is able to maintain the pressure of headspace gases evolved at a temperature range from 350° F. to the practical terminal temperature. In general, these pressures will depend to some extent on the headspace provided in the reaction vessel and the ratio of moisture to solids. Since condensable as well as noncondensable vapors will be evolved in the course of the reaction at a high rate, the pressure of the headspace will be substantially greater than that of saturated steam at the reaction temperature. If it is desired to lower the reaction pressure, this may be done by bleeding the apparatus by opening a pressure vent provided for that purpose until the desired reaction pressure is reached. However, it is generally preferred that much of the volatiles developed at the elevated temperatures practiced be retained in the headspace of the reaction vessel during the flavor-producing process. In general, the reaction pressures will therefore be above the pressure of saturated steam, but on the other hand, will not be in excess of the capacity of the vessel to capture and enclose at least some of the headspace vapors which have been observed to have desirable flavor notes and are therefore preferably retained in the vicinity of the reaction liquor during the process. In the equipment of the type specified in Example 1 herein, at a reaction temperature of 405° F., a pressure of, say 300–550 p.s.i.g. would be practiced.

Subsequent to the reaction, it has been found that it is essential to the development of an acceptable product to quickly quench the reaction and in this manner terminate it before the reaction continues and forms an unacceptable product. If the reaction is not quenched, the harshness and acidity factors will be produced to too great an extent. Due to the fact of the high temperature operation, it is essential to quench in an efficient manner in order to terminate the desired reaction completely. The quenching step is a rapid lowering of temperature, which may be effected by circulating a cooling media, such as cold tap water, around or in the coils of the reaction vessel, rapid or "flash" venting to the atmosphere, or as a preferred mode of operation, a combination of both means. If desired, the headspace gases may be condensed within the reaction vessel into the reaction liquor, and this type product is preferred by some consumers. The temperature should preferably be rapidly lowered to below 250° F. within 4–5 minutes, at which temperature the flavor-producing reaction has terminated, and the rate of cooling may then be slowed, the total desirable cooling to room temperature being completed within 10–15 minutes. Naturally, the different methods of cooling will produce slightly different flavors, and the preference of the ultimate consumer will determine the particular type of cooling to be used.

By the term "proteinaceous substance containing a sulfur-bearing amino acid" is meant either a protein in pure form or any proteinaceous material capable of producing among its decomposition products a free protein, and protein hydrolyzates containing peptides, amino acids, and mixtures of proteins and hydrolyzates in which is present a sulfur-bearing amino acid. Among the proteinaceous substances which may be used are legumes, grains, seeds, and fish or animal substances. Among the proteins which may be used are albumins, which are characterized by being water-soluble; globulins, which are insoluble in water; glutelins, which are soluble in dilute acids and alkalis; prolamines, which are soluble in a concentrated alcohol solution; albuminoids, which are usually insoluble are obtained from hide, bone and cartilage; histones, which are water-soluble; protamines, nucleoproteins, glycoproteins, phosphoproteins, chromoproteins, and lipoproteins. Among the decomposition products of proteins which are usable in the process of this invention are such primary protein derivatives as proteans, meta proteins, and coagulated proteins, and such secondary protein derivatives as proteoses, peptones, and peptides.

By the term "saccharide" is meant a reducing sugar or saccharide capable of reducing Fehling's solution to give cuprous oxide, or any saccharide and other material which provides a reducing saccharide or saccharides under the conditions of the reaction. The precursor material consists mainly of di- and polysaccharides which undergo molecular cleavage to yield reducing saccharides. Such precursors are the disaccharide, sucrose; the trisaccharide, raffinose; the polysaccharide material, dextrin, which of itself comprises both reducing saccharides and precursors thereof. The reducing saccharide includes all monosaccharides, disaccharides of the gentiobiose type, the trisaccharide, manninotriose. In addition, certain saccharic materials can be used which are derived from or closely related to the monosaccharides and have similar reducing properties such as the "-uronic" acid, galacturonic acid; the desoxy sugar, rhamnose; and the pentaacetate of galactose. Thus, the term saccharide as used in the claims will be understood to include all of the reducing saccharides, and saccharic compounds and precursors which provide reducing saccharides or sugar compounds under the conditions of the reaction by degradation of the molecule or in any other manner. The sugars which may be used include the pentoses, such as the aldopentoses, methyl pentoses and keto pentoses. Examples of these are xylose, arabinose, and rhamnose. Hexoses, such as glucose, galactose, and mannose, may also be used. Reducing disaccharides, such as lactose and maltose, and other disaccharides are also capable of being used. Syrup materials, such as "Frodex," which is composed of corn syrup solids (glucose, maltose, and dextrins), can also be used since the reducing saccharides are either present in them or will be produced as a decomposition product under the conditions of this reaction. The non-reducing polysaccharides which are precursors of the reducing saccharides will decompose and produce the reducing saccharides in all cases under the conditions of this reaction. Such non-reducing polysaccharides are dextrin and raffinose. It is to be understood that the substance containing the proteinaceous material may also contain the sugar, and thus the flavor can be developed from one source. In addition, starches of high molecular weight, of starch-like substances, such as insulin and glycogen, can be used, or substances such as the dextrins mentioned above, or celluloses, or hemicelluloses. Pentosans, such as gum arabic, which on hydrolysis yield arabinose; or galactans, such as agar-agar, yielding galactose on hydrolysis; or pectins, present in fruits, yielding galacturonic acid, arabinose, and galactose on hydrolysis, are also capable of being used.

As aforementioned, the base flavor factor of the present invention can be combined with various other flavor factors of coffee such as bitterness, astringency, aroma, and like factors in the preparation of flavors resembling the natural beverage or these factors may be added before the flavor-producing reaction. The bitterness, astringency, aroma, and like factors, whether employed alone or in combination, fail to provide a desirable flavor, but when one or more of these factors is combined with the base flavor factor of the present invention, the taste sensation is leveled off and prolonged because of the fullness and body provided by the base flavor factor. The base flavor factor can be regarded as a background against which the more distinctive flavor factors such as bitterness, astringency, aroma, and the like can be better appreciated.

Bitterness may be provided by the addition of bitter alkaloids such as caffein, theobromine, quinine, and the like. Other bitterness flavor factors that may be employed are the bitter polyacetates of polyhydric compounds such as the monosaccharides, glucose and levulose; the disaccharides, sucrose, lactose and maltose; the polyhydric alcohols, such as sorbitol and mannitol. Included in this class of bitterness factors are sucrose octaacetates, glucose triacetate, glucose tetraacetate, glucose pentaacetate, levulose triacetate, levulose tetraacetate, levulose pentaacetate, maltose octaacetate, sorbitol hexaacetate. Generally, the beta isomer of the polyacetates is much more bitter than the alpha isomer. Another class of bitterness flavor factors which may be employed are the bitter glucosides, such as quassin, naringin, the alpha-phenol-glucoside, beta-phenol-glucoside, 2,3,5,6-tetra-acetyl-alpha-phenol-glucoside, 2,3,5,6 - tetra - acetyl-beta - phenol-glucoside, 2,3,5,6-tetra-acetyl-alpha-methyl-glucoside, 2,3,5,6-tetra-acetyl-beta-methyl-glucoside. Still another group of bitterness flavor factors are the bitter acetonylated sugars such as diacetone-glucose, 3-acetyl-diacetone-glucose, 3-acetyl-monoacetone-glucose, 3-benzoyl-diacetone-glucose, and 6-benzoyl-monoacetone-glucose.

Still another class of bitter flavor factors are salts and esters of inorganic acids such as dulcitol pentanitrate, potassium sulfate, iso-amyl potassium sulfate, methylhexylcarbinol potassium sulfate.

Astringency may be provided by employing various tannins or tannates obtained by infusion or evaporation from wood, leaves or fruit of plants, e.g., extracts of the heartwood of acacias such as acacia catechu and acacia catechu sundra which are broadly referred to in the trade as "cutch," and the galls of oak, sumac, etc. Such astringency factors are generally water-soluble and include catechin having the formula $C_{16}H_{14}O_6$. Included in this class of compounds are dl-catechol, d-catechol and d-epi-catechol. Among some of the useful commercially available astringency factors are various powdered products such as cocoa tannins, catechu gum, gambir gum, rhatany root, eyebright herb, white oak bark, witch hazel bark, quebracho wood extract, chestnut leaves, red oak bark, black kino gum and gum myrrh. Other astringent materials include the alums such as sodium, potassium, ammonium, and like alums.

The supernatant solution resulting from the reaction of the proteinaceous material and saccharide may be separated from the residue by any desired means, such as centrifuging, filtration or by a combination of both means, followed by a drying in any manner desired, either alone or with a bulking agent, such as corn syrup solids. The drying may be by vacuum concentration, spray drying, drum drying, freeze drying, or any desired combination of these methods.

In the production of these flavors it has been observed that heating for 4 hours at a temperature range of 264°–298° F. or at a temperature range of 289°–338° F. will not produce a flavor which resembles the beverage flavor which has been produced by the process of this invention. The flavor of these products was comparable to that of roasted fruit, roasted cereal, or a prune-like flavor. These are generally the type flavors associated with the normal browning reactions or the caramelization of sugar. In constrast, when the reactants discussed above are reacted about 350° F., it has been found that a very short period of time will produce a beverage flavor having a chocolate or coffee-like aroma and taste. Thus, if the reactants are at the atmospheric boiling point of water, 212° F., it has been found that various time and temperature combinations may be used in order to produce the superior beverage flavor of the present invention. For instance, starting at the boiling point of water, the reactants may be heated for 26 minutes to reach a temperature of 350° F., followed by an additional heating for 6 minutes to reach a temperature of 405° F. The quenching to a temperature below 250° F. must take place within 4–5 minutes, and accordingly, one variant of this time-temperature relationship is to lower the temperature of this reaction to a point below 250° F. (240° F.) within 4 minutes, followed by lowering to a temperature of 77° F. in an additional 9 minutes of cooling. The above relationship may be observed in a 2-liter autoclave. If a larger autoclave, such as a 5-gallon autoclave, is used, the heat lag of the equipment will be somewhat greater, and accordingly, the relationships of time to temperature will be varied. Thus, if the temperature of the reactants being placed in a 5-gallon autoclave is approximately 150° F., the reactants may be heated while the autoclave is left open to a temperature of approximately 212° F. in 5 minutes. The air in the autoclave is then discharged by the steam and the exhaust vent of the autoclave is closed. An additional 3 minutes will be required for this procedure. The reactants have, therefore, been in the autoclave for 8 minutes. However, for purposes of comparison to the smaller autoclave discussed above (the 2-liter autoclave), they are now at the same temperature and the same conditions as the reactants in the smaller 2-liter autoclave. The reactants may then be heated to 350° F. in an additional 27 minutes, thus having been in the autoclave for a total time of 35 minutes. They are then heated to 400° F. in an additional 8 minutes and to 403° F. in an additional 5 minutes over and above the length of time required to reach 400° F. The reactants have then been in the autoclave for 48 minutes. The heating coils of the autoclave are then shut and the autoclave should be cooled to a temperature below 250° F. within 4–5 minutes, followed by a cooling to a temperature of 70° F. in an additional 8 minutes. Thus, the reactants have been in the autoclave for approximately 1 hour after their insertion at 150° F.

The following examples illustrate embodiments of the invention, but it is to be understood that these examples are for purposes of illustration and that the invention is not limited thereto, since various changes can be made by those skilled-in-the-art without departing from its scope and spirit.

*Example 1*

Seventy-eight grams peanut meal, 78 grams wheat bran, 44 grams sucrose, 13.2 grams calcium carbonate and 1000 ml. water are thoroughly mixed and then placed in a Parr 2-liter pressure reaction autoclave.

The Parr 2-liter pressure reaction autoclave is a stainless steel reaction bomb with a motor driven stirrer and an electric bomb heater, all assembled on a steel base plate. It has fittings for introducing compressed gas while agitating and heating, or for removing liquid samples while under pressure, or for bleeding gas from the bomb chamber. The bomb also has a pressure gauge, and a means for controlling the temperature by a variable voltage transformer mounted on the base plate. The stirrer shaft can be cooled with circulating water. The temperature is read from a dial thermometer inserted in the bomb thermowell, and there is an internal cooling coil, through which the bomb can be cooled by circulating cold tap water at 50°–70° F. The time of heating required to reach a temperature of 400° F. is approximately one-half hour, varying from 30–40 minutes.

The reaction mixture is then brought to the atmospheric boiling point, the autoclave sealed, and the reactants may then be heated to 350° F. in 26 minutes and to 400° F. in an additional 6 minutes with continuous agitation, followed by immediately quenching to 240° F. within 4 minutes, followed by reducing to room temperature in a total time of 13 minutes by running cold water through the internal cooling coils. The solution is then filtered, and the filtrate diluted to form a 2% solids concentration aqueous solution.

*Example 2*

Seventy-eight grams wheat bran, 78 grams peanut meal, 44 grams sucrose, and 1000 ml. water are thoroughly mixed and then placed in a Parr 2-liter pressure reaction autocave. The reaction mixture is then brought to the atmospheric boiling point, the autoclave sealed, and the reactants may then be heated to 350° F. in 26 minutes and to 400° F. in an additional 5 minutes with continuous agitation, followed by immediately quenching to 150° F. within 5 minutes, followed by reducing to room temperature in a total time of 14 minutes by running cold water through the internal cooling coils. The solution is then filtered, and the filtrate diluted to form a 2% solids concentration aqueous solution.

*Example 3*

Seventy-eight grams wheat bran, 78 grams peanut meal, 13.2 grams calcium carbonate, and 1000 ml. water are thoroughly mixed and then placed in a Parr 2-liter pressure reaction autoclave. The reaction mixture is then brought to the atmospheric boiling point, the autoclave sealed, and the reactants may then be heated to 350° F. in 27 minutes and to 405° F. in an additional 6 minutes with continuous agitation, followed by immediately quenching to 150° F. within 5 minutes, followed by reducing to room temperature in a total time of 15 minutes by running cold water through the internal cooling coils. The solution is then filtered, and the filtrate diluted to form a 2% solids concentration aqueous solution.

*Example 4*

The following compositions were thoroughly mixed and then placed in a Parr 8-ml. bomb:

| | | |
|---|---|---|
| Hoof keratin | gm__ | 2 |
| Sucrose | gm__ | 2 |
| Water | ml__ | 2 |

The reactants were approximately at the temperature of the oil bath, although slightly therebeneath. In a vessel such as the peroxide bomb, agitation is not present and the heating rate is relatively slow for such a small container. The temperature rise within the bomb would approximate a peak of 410°–420° F. during the immersion, followed by rapid quenching. With an oil bath temperature of 420° F., this might require 8 minutes. At 425° F. oil bath temperature, 5 to 6 minutes suffice to reach this roasting temperature of 410°–420° F. peak.

The 8-ml. bomb is a peroxide bomb apparatus, which is a thimble shaped device with a gasket, cover, and provision for securing the cover to the body.

The sealed bomb was heated for 6 minutes in an oil bath at 425° F., followed by immersion in a cold tap water bath, and subsequently venting to the atmosphere. The cold water bath is at a temperature of 50°–70° F. Under the conditions in cold water of 50°–70° F., 3 minutes would suffice to reduce the temperature to below 150° F. The solution was then filtered, and the filtrate diluted to form a 2% solids concentration aqueous solution.

*Example 5*

The following compositions were thoroughly mixed and then placed in a Parr 8-ml. bomb:

| | | |
|---|---|---|
| Feather keratin | gm__ | 1.5 |
| Sucrose | gm__ | 4.5 |
| Water | ml__ | 3.0 |

The sealed bomb was heated for 6 minutes in an oil bath at 425° F., followed by immersion in a cold water bath, and subsequently venting to the atmosphere. The solution was then filtered, and the filtrate diluted to form a 2% solids concentration aqueous solution.

*Example 6*

The following compositions were thoroughly mixed and then placed in a Parr 8-ml. bomb:

| | | |
|---|---|---|
| Chicken breast meat | gm__ | 3 |
| Sucrose | gm__ | 1 |
| Water | ml__ | 6 |

The sealed bomb was heated for 6 minutes in an oil bath at 425° F., followed by immersion in a cold water bath, and substantially venting to the atmosphere. The solution was then filtered, and the filtrate diluted to form a 2% solids concentration aqueous solution.

*Example 7*

The following compositions were thoroughly mixed and then placed in a Parr 8-ml. bomb:

| | | |
|---|---|---|
| Histidine | gm__ | 0.1 |
| Malted corn sprouts | gm__ | 5.9 |
| Water | ml__ | 4.0 |

The sealed bomb was heated for 6 minutes in an oil bath at 425° F., followed by immersion in a cold war bath, and subsequently venting to the atmosphere. The solution was then filtered, and the filtrate diluted to form a 2% solids concentration aqueous solution.

*Example 8*

The ingredients of Example 3 above may be reacted as shown in that example. During the course of the run, as the temperature increases above 212° F. to a temperature of approximately 350° F., normal increases were observed. At approximately 350° F., in a period of approximately 1–2 minutes, a rapid increase of pressure occurs which results in a pressure differential over that which would be observed for saturated steam of a magnitude of 70–90 p.s.i.g.

For example, with saturated steam at 350° F., a pressure of 150 p.s.i.g. is observed, whereas in this example, the reaction mixture generated a pressure of 225 p.s.i.g.

As the temperature is increased to approximately 385° F., the pressure continues to show a more rapid increase than would be normally experienced with saturated steam. At this temperature, normal steam would exhibit 225 p.s.i.g., whereas the reaction mixture employed rose to a pressure of 430 p.s.i.g.

It is therefore readily seen that in addition to being used as either a beverage flavor or the base for a beverage flavor in combination with various astringency and bitterness factors, as are discussed above, the products of the process of this invention may be used in any type food where the particular beverage flavor is used as a base. These products may therefore be used as the base flavors for icings, confections, or candy of any nature.

The present application is a continuation-in-part of Serial No. 741,740, filed June 13, 1958 (now abandoned) and Serial No. 175,821, filed February 26, 1962 (now abandoned).

While the present invention has been described with particular reference to specific examples, it is not to be limited thereby, but reference is to be had to the appended claims for a definition of its scope.

What is claimed is:

1. A process for producing a beverage flavor comprising heating a hydrous reaction mixture of a proteinaceous material containing a sulfur-bearing amino acid and a saccharide in a partially filled reaction vessel to achieve an elevated reaction temperature of at least 350° F. and cause evolution of gaseous constituents from said hydrous reaction mixture, enclosing the gaseous constituents developed and released in the head space of the reaction vessel while maintaining said hydrous reaction condition, the head space pressure of gaseous constituents in the reaction vessel being 75 to 225 p.s.i.g. over the normal pressure for saturated steam at the reaction temperature, the reaction temperature being thereby elevated to a point in the reaction whereat desired flavors are produced at a rate faster than undesirable interfering flavors, holding said conditions for a holding period sufficient to develop flavor, and upon development of said flavor rapidly reducing the temperature of the reaction liquor in said vessel to below 250° F. whereat flavor development is arrested.

2. A process according to claim 1 wherein the flavor is developed by maintaining a reaction temperature substantially above 350° F. and below 475° F.

3. A process according to claim 1 wherein the flavor-producing reaction is carried out in the presence of an acid-neutralizing substance such that the cooled reaction liquor has a pH above 4.0.

4. A process according to claim 3 wherein the acid-neutralizing substance is calcium carbonate.

5. A process according to claim 1 wherein the reaction mixture is rapidly carried to a peak reaction temperature in the neighborhood of 405° F. and wherein the reaction liquor is rapidly cooled to a temperature below 212° F. after achievement of said peak reaction temperature.

6. A process according to claim 1 wherein an acid-neutralizing substance is employed in the hydrous reaction mixture at a level sufficient to provide a reaction liquor having a pH between 4.5 and 5.2.

7. A process according to claim 6 wherein the acid-neutralizing substance is calcium carbonate.

8. The process of claim 1 wherein the reduction in temperature is to below 250° F. and occurs within 4 to 5 minutes, and the total time of cooling to room temperature is within 10 to 12 minutes.

9. The process of claim 1 in which the saccharide is corn syrup solids.

10. The product of the process of claim 1.

References Cited in the file of this patent
UNITED STATES PATENTS

| | | |
|---|---|---|
| 1,133,037 | Kellogg | Mar. 23, 1915 |
| 1,544,649 | Kellogg | July 7, 1925 |
| 1,956,427 | McKinnis | Apr. 24, 1934 |

UNITED STATES PATENT OFFICE

CERTIFICATE OF CORRECTION

Patent No. 3,102,817                                                    September 3, 1963

Julius Green

It is hereby certified that error appears in the above numbered patent requiring correction and that the said Letters Patent should read as corrected below.

Column 5, line 18, for "of" read -- or --; column 6, line 3, for "$C_{16}H_{14}O_6$" read -- $C_{15}H_{14}O_6$ --; line 32, for "about" read -- above --; column 8, line 52, for "substantially" read -- subsequently --; line 64, for "war" read -- water --.

Signed and sealed this 14th day of April 1964.

(SEAL)
Attest:

ERNEST W. SWIDER

Attesting Officer

EDWARD J. BRENNER

Commissioner of Patents